US008872870B2

(12) United States Patent
Witzmann et al.

(10) Patent No.: US 8,872,870 B2
(45) Date of Patent: Oct. 28, 2014

(54) METHOD AND APPARATUS FOR MARKING GLASS

(75) Inventors: Andre Witzmann, Waldershof (DE); Ulla Trinks, Mitterteich (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/811,315

(22) PCT Filed: Aug. 30, 2011

(86) PCT No.: PCT/EP2011/064901
§ 371 (c)(1),
(2), (4) Date: Jan. 21, 2013

(87) PCT Pub. No.: WO2012/028611
PCT Pub. Date: Mar. 8, 2012

(65) Prior Publication Data
US 2013/0169732 A1    Jul. 4, 2013

(30) Foreign Application Priority Data

Sep. 2, 2010  (DE) .......................... 10 2010 037 273

(51) Int. Cl.
| | |
|---|---|
| *B41J 2/435* | (2006.01) |
| *B41J 2/44* | (2006.01) |
| *G06K 1/12* | (2006.01) |
| *C03C 23/00* | (2006.01) |
| *B41M 5/26* | (2006.01) |

(52) U.S. Cl.
CPC ................. *B41J 2/442* (2013.01); *G06K 1/126* (2013.01); *C03C 23/0025* (2013.01); *B41M 5/262* (2013.01)
USPC ........................................................ 347/224

(58) Field of Classification Search
USPC .................. 347/224, 225; 219/121.6, 121.68, 219/121.69, 121.78–121.82
See application file for complete search history.

(56) References Cited

U.S. PATENT DOCUMENTS

| | | | | |
|---|---|---|---|---|
| 5,229,574 | A | * | 7/1993 | Stone ....................... 219/121.68 |
| 6,596,966 | B1 | | 7/2003 | Kickelhain et al. |

(Continued)

FOREIGN PATENT DOCUMENTS

| | | |
|---|---|---|
| DE | 4224282 | 1/1994 |
| DE | 4407547 | 9/1995 |

(Continued)

OTHER PUBLICATIONS

Official Action for German Patent Application No. 10 2010 037 273.0, dated Apr. 13, 2011 and its English translation.

(Continued)

*Primary Examiner* — Hai C Pham
(74) *Attorney, Agent, or Firm* — Renner, Otto, Boisselle & Sklar, LLP

(57) ABSTRACT

In a method and apparatus for marking glass or a glass-like material a writing laser beam and the glass or the material are moved relative to each other in order to form an array of marks on the glass surface or material surface consisting of a plurality of discrete marks which are formed in discrete marking steps and are distributed along at least one direction. Marks directly adjacent to each other in a predetermined direction are formed in two marking steps, which are not carried out directly in succession one after the other. Thus, at least two series of marks are produced in the predetermined direction, wherein said marks are spaced at regular intervals from each other and are interleaved in the predetermined direction. As a result, and because of the temperature regime according to the invention during encoding, a particularly low-stress, crack-free marking of glass can be accomplished.

27 Claims, 8 Drawing Sheets

(56) References Cited

U.S. PATENT DOCUMENTS

| | | | |
|---|---|---|---|
| 6,674,043 B2 * | 1/2004 | Trinks et al. | 219/121.69 |
| 7,856,795 B2 | 12/2010 | Grimard | |
| 8,173,038 B2 * | 5/2012 | Wagner | 216/97 |
| 8,196,807 B2 | 6/2012 | Grimard | |
| 2003/0029849 A1 | 2/2003 | Trinks et al. | |
| 2005/0218126 A1 | 10/2005 | Leyvraz | |
| 2009/0261082 A1 | 10/2009 | Wagner | |

FOREIGN PATENT DOCUMENTS

| | | |
|---|---|---|
| DE | 19926878 | 12/1999 |
| DE | 10122335 | 7/2002 |
| DE | 10234002 | 2/2004 |
| EP | 0761377 | 8/1996 |
| GB | 2078621 | 1/1982 |
| WO | 92/03297 | 3/1992 |
| WO | 94/14567 | 7/1994 |
| WO | 95/05286 | 2/1995 |
| WO | 96/10777 | 4/1996 |
| WO | 00/32349 | 6/2000 |
| WO | 00/32531 | 6/2000 |
| WO | 2004/000749 | 12/2003 |
| WO | 2009/128893 | 10/2009 |

OTHER PUBLICATIONS

International Search Report for International Application No. PCT/EP2011/064901 dated Dec. 8, 2011.
Official Action for Japanese Patent Application No. 2013-526443 dated Jul. 30, 2013.

* cited by examiner

METHOD AND APPARATUS FOR MARKING GLASS

The present application claims the priority of German patent application No. 10 2010 037 273.0-45, filed on 2 Sep. 2010 entitled "Method and Apparatus for Marking Glass," the content of which is hereby expressly incorporated herein by reference.

FIELD OF THE INVENTION

The present invention relates to a method and an apparatus for marking or inscribing of glass.

BACKGROUND OF THE INVENTION

A reliable marking or inscribing of glass or glass products is becoming increasingly important, e.g. for marking glass batches or products made of glass, for example for tracking purposes. In particular also tamper-proof marks in or on glass may be desirable to ensure an original quality, for example, in primary packaging made of glass, for example in the form of glass vials for the pharmaceutical industry.

Recently laser radiation is increasingly used for marking or inscribing of glass. Such methods are very clearly described in the introductory part of the description of the German patent application DE 102 34 002 A1 of the applicant, the content of which is hereby expressly incorporated herein by reference for purposes of disclosure. Such methods, however, often require particular measures, which are typically expensive.

The German patent DE 101 22 335 C1 (corresponding to U.S. patent application US 2003/0029849 A1) of the applicant discloses a method and apparatus for marking glass with a laser in which by thermal impact on the surface of the glass to be marked a mark is provided on the surface of the glass. The marks are in this case formed at high temperatures above the transformation temperature of the glass, for example in a tube-drawing plant during the production of glass tubes.

German patent application DE 102 34 002 A1 of the applicant discloses a similar method in which the mark is formed by one or more local deformations of the surface of the glass, which respectively implement a lens effect.

WO 2009/128893 A1 discloses a laser ablation method for forming microstructure cavities in the surface of a glass substrate for applications, such as micro-fluidic systems, providing hyper-hydrophobic surfaces, micro cavity arrays, micro-lens systems, cells for life science applications and providing of micro-mixing reactors. Disclosed is a first embodiment in which a first plurality of laser spots are set along a first line, and then a further plurality of laser spots are set along a second line which is parallel to the first line. Disclosed is also a second embodiment, in which a continuous series of laser spots overlapping with each other are formed line-wise in dense intervals and in a "stuttering" manner, namely in cross-wise geometry. The laser spots overlap each other. The micro-structure-cavities in the surface of a glass substrate are formed by laser ablation. It is not important, however, whether mutually adjacent laser spots are set simultaneously or sequentially to each other. Rather, the opening diameter and the shape of the micro-structure cavities to be formed in the surface of the glass substrate are adjusted by means of the distance between the laser spots to each other and by means of the overlap of the laser spot to each other.

In particular for forming complex marks consisting of many marking points a high amount of energy needs to be deposited in the glass within a relatively short period, which may still lead to a weakening of the material, for example to micro-cracks, despite the formation of the marks at temperatures above the transformation temperature of the glass.

SUMMARY OF THE INVENTION

It is an object of the present invention to provide an enhanced method and an enhanced apparatus for marking or inscribing of glass or a glass-like material, which is not necessarily a transparent material, whereby a more reliable and material gentler marking of glass or glass-like materials can be implemented. According to further aspects of the present invention furthermore a corresponding method and a corresponding apparatus is to be provided, enabling particularly tamper-proof and/or well-readable marks.

In a method according to the present invention marks directly adjacent to each other are not formed in two marking steps that are executed immediately one after the other. Rather, according to the invention a further marking step is performed between these two marking steps, which step serves to form a further mark, which is not directly adjacent to the first mark and is formed by means of the two above-mentioned marking steps. In other words, according to the present invention the marks are not formed directly in series or sequentially but are formed timely offset. Thus, after a first mark firstly a mark is formed that is not directly adjacent to the first mark before the further mark is formed in the further step of marking, or in a further time-shifted step of marking. According to an exemplary preferred embodiment, for example, after the first mark firstly a next but one mark may be formed, before, in the further step of marking a further mark is formed, which is formed between the first mark and the next but one mark or between the first mark and a further remote mark.

In this way according to the invention an array of marks consisting of a plurality of discrete marks can be formed quickly and the resulting thermal and mechanical stress of the material, however, can be kept advantageously low and can be better distributed in the material. Namely, the material is allowed to cool down between the formation of immediately adjacent marks to some extent. Thus, the mechanical strength of the array of marks can be advantageously increased according to the invention. Elaborate series of experiments of the inventors have in particular shown that, if two directly adjacent marks in accordance with the prior art are formed directly one after the other, a higher material temperature would prevail in the overlapping zone between the two marks than if only a single marking step would be performed, which conventionally would result in negative impact on the material strength. However, according to the invention the sequence of marking steps can be adjusted such that the temperature gradient, which is caused by a preceding step of marking, has almost completely degraded at the time of the subsequent step of marking, and thus a similar temperature profile prevails as in the case of a single marking step.

In general, the staggered writing of adjacent marks according to the invention may be performed in any order of the individual marks, as long as it is ensured that overall the desired array of marks is formed by the plurality of marks, and as long as it is prevented that directly adjacent marks are formed by means of marking steps performed directly one after the other. For this purpose, in principle a laser beam may also write the individual marks in an array of marks in a random sequence, as long as overall it is ensured that the desired array of marks is formed by the plurality of marks, and as long as it is prevented, however, that directly adjacent marks are formed by means of marking steps performed immediately one after the other. This random sequence of consecutive marks is therefore subject to a constraint, namely that it is prevented that directly adjacent marks are formed by means of marking steps performed immediately one after the other. In general, however, a regular sequence of the individual marking steps is preferred according to the invention, for example embodied of interleaved or staggered marking rows of individual punctiform marks.

In a method according to the invention, the marks are preferably distributed along at least one spatial direction, preferably along two mutually orthogonal directions in space. In such an embodiment, the marks are thus formed in a defined sequence, which is adapted to the pattern of the coding. An optimization of the coding speed with regard to speed or maximum time interval between two adjacent laser spots is preferred.

Preferably, the marks are thereby formed staggered at regular intervals along the respective direction in space, so that overall a one-dimensional or two-dimensional array is formed consisting of discrete marker points which can be used for encoding information.

According to a further embodiment, the marking steps form at least two series of regularly spaced marks in the respective predetermined direction, which are interleaved or interlaced in the respective predetermined direction. This can be implemented, for example, by deflecting a pulsed laser beam on a glass surface, wherein for each scan row or scan column only next but one, next but second etc. marker points are written and the respective rows or columns are again scanned offset in a subsequent scan for writing the respective offset marker points of the array of marks. The time-delayed writing of the sequences of marker points according to the invention facilitates the formation of the array of marks considerably. In particular, in this manner also very uniform conditions are maintained for each marker point.

For obtaining a high mechanical strength and to prevent the formation of cracks it has turned out to be of particular advantage, if the marks are formed at a predetermined temperature of at least 20K above the transformation temperature Tg of the glass. In a first embodiment in principle this can be achieved by suitably adjusting the power and/or intensity of the laser pulses. According to a preferred embodiment of the invention the array of marks or the entire array of marks and its immediate vicinity is heated suitably so that the individual marks are inscribed at the predetermined temperature of at least 20 K above the transformation temperature of the glass.

For this purpose, the temperature of the array of marks or of the array of marks and the immediate vicinity can be maintained permanently at a temperature of at least 20K above the transformation temperature of the glass. According to the invention, the intensity of the laser pulses is adjusted such that these do not cause any heating of the material, or in any case there is no significant heating of the material, however, overall the material is heated to temperatures of at least 20K above the transformation temperature at least for the writing of the respective marker points.

For heating the array of marks or the array of marks and its immediate vicinity can basically any heating method can be used, including burner heating, infrared heating, etc. Preferably, however, a preheating by means of optical radiation, especially with the help of a suitably expanded or imaged hearing laser beam, such as an expanded laser beam of a $CO_2$-laser is used.

An array of marks with even less tension can be achieved according to a further embodiment, when the marks or the array of marks is cooled in a controller manner during and/or after performing the marking steps until a second predetermined temperature below the transformation temperature of the glass has been attained. For this purpose, in principle, the heating method used for heating the material may be used, in particular, a suitably modulated heating laser beam. Alternatively, also a controlled infrared heating can be used, for example by removing the glass immediately after performing the marking step and cooling it in a downstream infrared furnace.

Suitably, the second predetermined temperature is at least 20K below the transformation temperature of the glass, more preferably at least 40K below the transformation temperature of the glass.

After the temperature has fallen below the second predetermined temperature according with a further preferred embodiment a further cooling of the glass may be performed, for example until attaining room temperature or a temperature suitable for further processing. This further cooling does not need to be controlled in terms of a predetermined cooling rate or cooling profile. The marked material particularly may also be cooled down gradually at ambient conditions.

According to another preferred embodiment, between two marking steps for forming directly adjacent marks a predetermined time-period exists during which the intensity of the writing laser beam is reduced or is negligible in or on the glass or material. Preferably, this period lasts for at least 10 ms. In this manner according to the invention an array of marks can be achieved that is advantageously stable and has low tension.

According to another embodiment, at least some of the discrete marks that are formed in the array of marks directly adjacent to each other, are formed partially overlapping with each other. This embodiment is based on the following surprising discovery by the inventors, which is the result of elaborate series of experiments: The inventors have developed an approach for the assessment of the quality of reading for reading the marker points. Of course, it is desired to form the discrete marks of an array of marks such that it can be read out with high accuracy and reliability, and that overall the information previously encoded in the array of marks can be read out again accurately and reliably. For this purpose, one would expect that directly adjacent marks are actually formed spaced apart from each other in the material, that is in the form of discrete points which do not overlap with each other. Although this has the disadvantage of a lower packing density of the array of marks—for the same diameter of the marks—, this would have the advantage of a high read-out accuracy. Surprisingly, the inventors have now found out that the read-out accuracy of the marker points can be enhanced even if directly adjacent marker points overlap each other to some extent. According to the invention this provides the advantage of an even higher packing density combined with a higher reliability and read-out accuracy. One would expect a deterioration of the read-out quality if directly adjacent marker points overlap with each other. Without being set to this explanation, it is, however, suspected as a major reason for the actually observed efficient read-out quality that the discrete points which act as concave imaging lenses for the light reading out the array of marks in fact only the very core of the respective marks acts as an imaging lens but not the outer peripheral edge of the respective marker point. It should be noted here that the optimum size of the marks can also be dependent on the design of the optical inspection system.

In principle the marker points can also be formed as oval marker points, which are formed such that directly adjacent marker points are overlapping each other to some extent. According to a preferred embodiment, those discrete marks, which are directly adjacent to each other in the array of marks, are formed as circular marks, each with a predetermined diameter and formed such that the respective predetermined diameter of said directly adjacent marks is by up to 10%, preferably by up to 20% larger than the distance between these marks.

Another aspect of the present invention further relates to an apparatus for marking or inscribing of a glass or a glass-like, not necessarily transparent material, which is configured for carrying out the above method. Thus there is also provided an apparatus for marking of glass or a glass-like material by means of a plurality of discrete marks in or on the glass or glass-like material, which jointly form an array of marks, in particular for performing the method as described above, comprising: a write laser for generating a writing laser beam imaged on the glass or the material and a displacement means for moving the writing laser beam and the glass or the material relative to each other during the formation of the array of marks, wherein the displacement means is configured to move the writing laser beam and the glass or the material relative to each other such that a plurality of discrete marks are formed in or on the glass or material which together form the array of marks, and a control means is provided which is configured such that marks that are directly adjacent to each other in a predetermined direction are formed in two marking steps that are not carried out immediately in succession. According to the invention the control means is further configured such that the respective series of regularly spaced marks are formed by relative movement between the writing laser beam and the glass or glass-like material along the predetermined direction row by row or column by column or by the formation of the marks in a random sequence such that a formation of directly adjacent marks by means of marking steps that are performed immediately one after the other is prevented

OVERVIEW ON DRAWINGS

In the following, the invention will be described in exemplary manner and with reference to the appended drawings, from which further advantages, features and problems to be solved will become apparent. In the drawings.

Figure 7A:
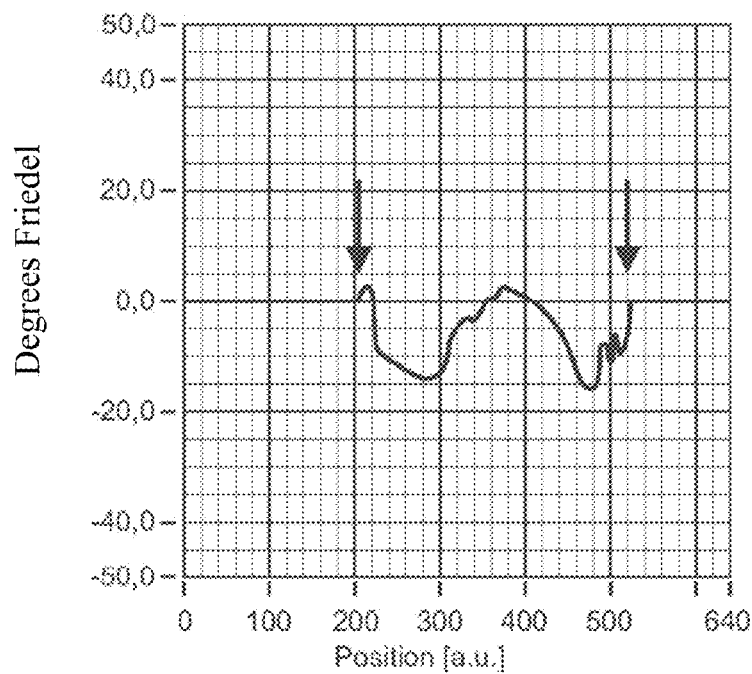
Figure 7B:
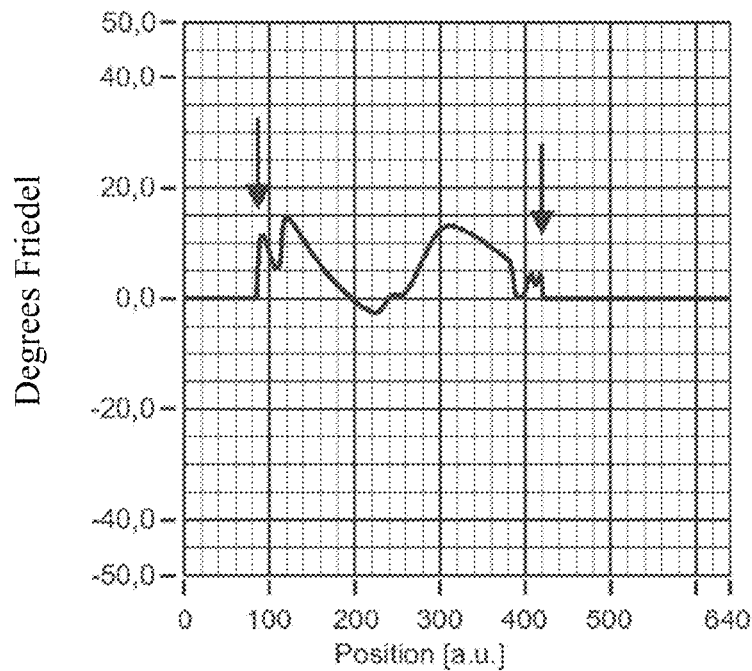
Figure 8A:
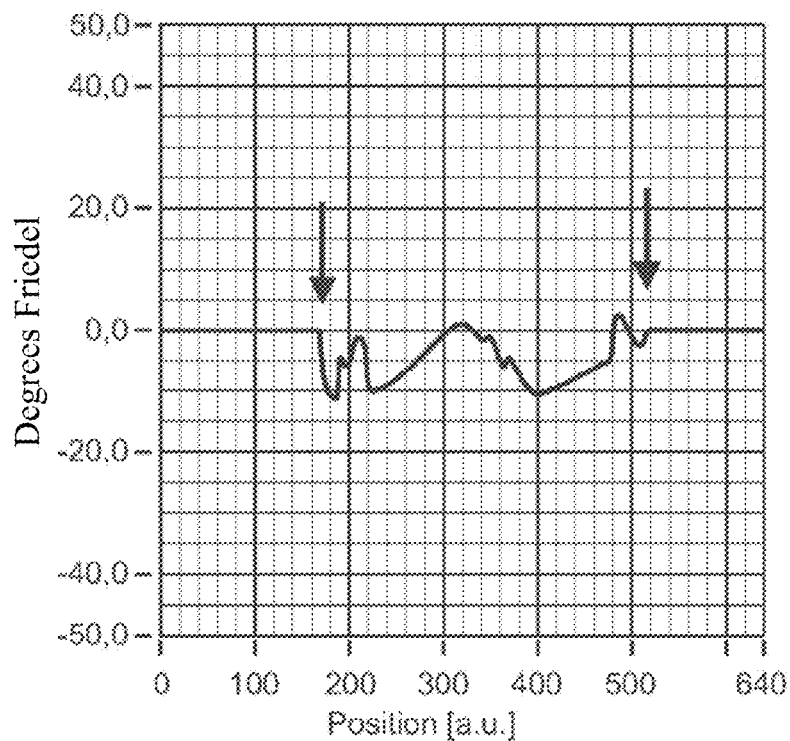
Figure 8B:
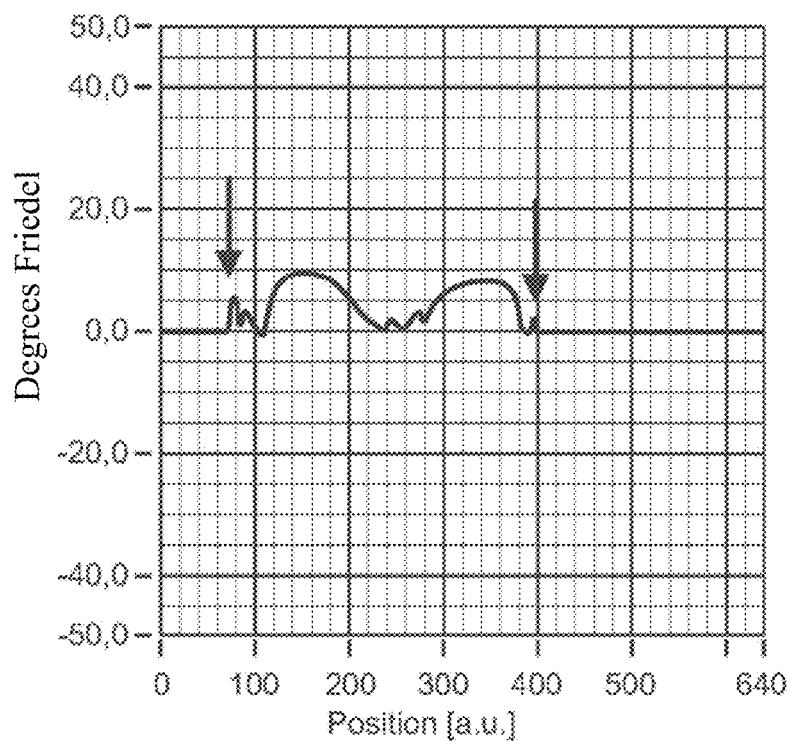

FIG. 7a and FIG. 7b show the corresponding tension profile across a mark along two axes orthogonal to each other, which has been generated by means of a method according to the present invention with additional heating; and FIG. 8 and FIG. 8b show the tension profile across a mark along two axes orthogonal to each other, which has been generated by means of a method according to a further embodiment of the present invention, wherein the tension reduction has been accomplished by controlled tempering.

In the drawings, identical reference numerals designate identical or substantially equivalent elements or groups of elements.

DETAILED DESCRIPTION OF PREFERRED EMBODIMENTS

Figure 1:
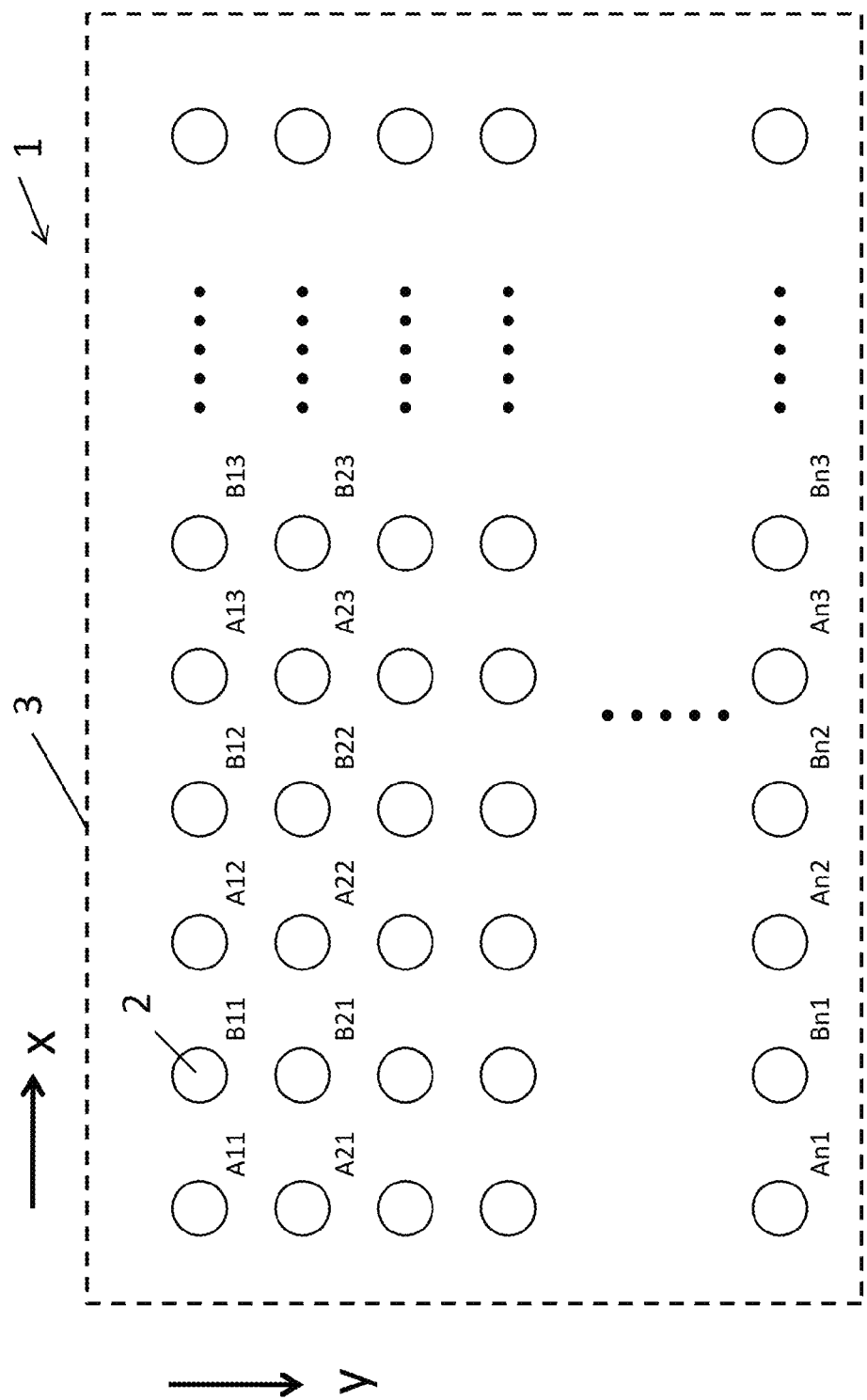
FIG. 1 shows in a schematic top view an array of marks according to the present invention consisting of a plurality of discrete marks.

FIG. 1 shows an example of a digital matrix code 1 which consists of a plurality of marks 2, which are distributed along rows (in the x-direction) and columns (along the y-direction), namely at regular intervals. As an example it is hereinafter assumed that the matrix arrangement of the two marker points completely covers the matrix code 1, although this is not necessarily the case in practical examples. Overall, according to FIG. 1 the marks 2 are arranged within an array of marks 3. In general, the individual marks 2 can be formed here as described in DE 102 34 002 A1 and DE 101 22 335 C1 of the applicant, but with the modifications described below.

By means of the respective marks in particular a local deformation having a lens effect may be caused, so that the digital matrix code can be read-out automatically. In this manner it encodes information, for example, about the material, quality, origin, date of production and so on of the glass or even about the content, origin, date of manufacture, batch number, and the like in a product made of glass, such as a primary packaging for the pharmaceutical industry, particularly a glass vial. As an example, a data matrix code in accordance with ISO/IEC 16022:2000 and ISO/IEC 24720:2006 may be used. The encoding of information can e.g. be designed in accordance with the EFPIA (Press Release of the European Federation of Pharmaceutical Industries and Associations of 7 Oct. 2008).

For encoding the individual focal length of a respective local deformation can be used or even different focal lengths of the same the local deformation or the focal lengths of various different local deformations may be used. Furthermore, also the distances between the individual deformations may be used to encode information.

In a digital matrix code 1 according to the present invention, the marker points 2 are not formed by means of marking steps that are performed directly in succession one after the other, in the order of the rows and columns. Rather the marks 2 are set such that, in an x-, y-direction marks that are directly adjacent to each other are formed in two marking steps, which are not carried out immediately in succession one after the other, but between which a further step of marking is carried out for the formation of a marker point 2 that is not directly adjacent.

Assuming in the example according to FIG. 1 as an example, that the matrix code is inscribed line-wise at a time by scanning a laser beam in the x-direction, it is not the directly adjacent mark B11 that is written immediately after forming the mark A11, but in this example the next but one mark A12 and then in turn the next but one mark A13, etc., until finally the entire first row of the matrix code 1 is inscribed. In the example, therefore, the letter A designates marks that are written during the first scan of the respective line of the matrix code. Accordingly, in FIG. 1 marks, which are written in a subsequent scan of the same line of the matrix code, are designated by the letter B. Thus, in a subsequent line scan in the first line the marker points B11, B12, B13, etc. are written in this order until finally the entire first line of the matrix code is written, then with marker points that are offset relative to the first scanning step. This process is repeated correspondingly with the other lines of the matrix code, starting with A21, A31, and so on, until finally the entire matrix code 1 is written or inscribed.

Thus, in the matrix code 1 according to FIG. 1 the sequences formed by the marker points A11, A12, A13, ..., and by the marker points B11, B12, B13, ... respectively form sequences of marks at regular spacings to each other, which are interleaved in the respective predetermined direction (i.e. for a line-wise scanning in the x-direction).

Obviously, also other writing schemes may be selected, so that for example in the respective line of the matrix code also the first, fourth, seventh, ... marker point may be written, then the second, fifth, eighth, ... marker point, and finally the third, sixth, ninth, ... marker point, until the respective entire line of the matrix code is written.

For writing the respective rows or columns preferably a writing laser beam is used. Basically, however, also a plurality of writing laser beams mutually offset may be used simultaneously.

By means of the above writing process the temperature profile of a marker point is much less disturbed by directly adjacent marks that just have been written beforehand. In this manner, according to the present invention arrays of marks can be implemented that are more stable and have less tension.

Figure 2:
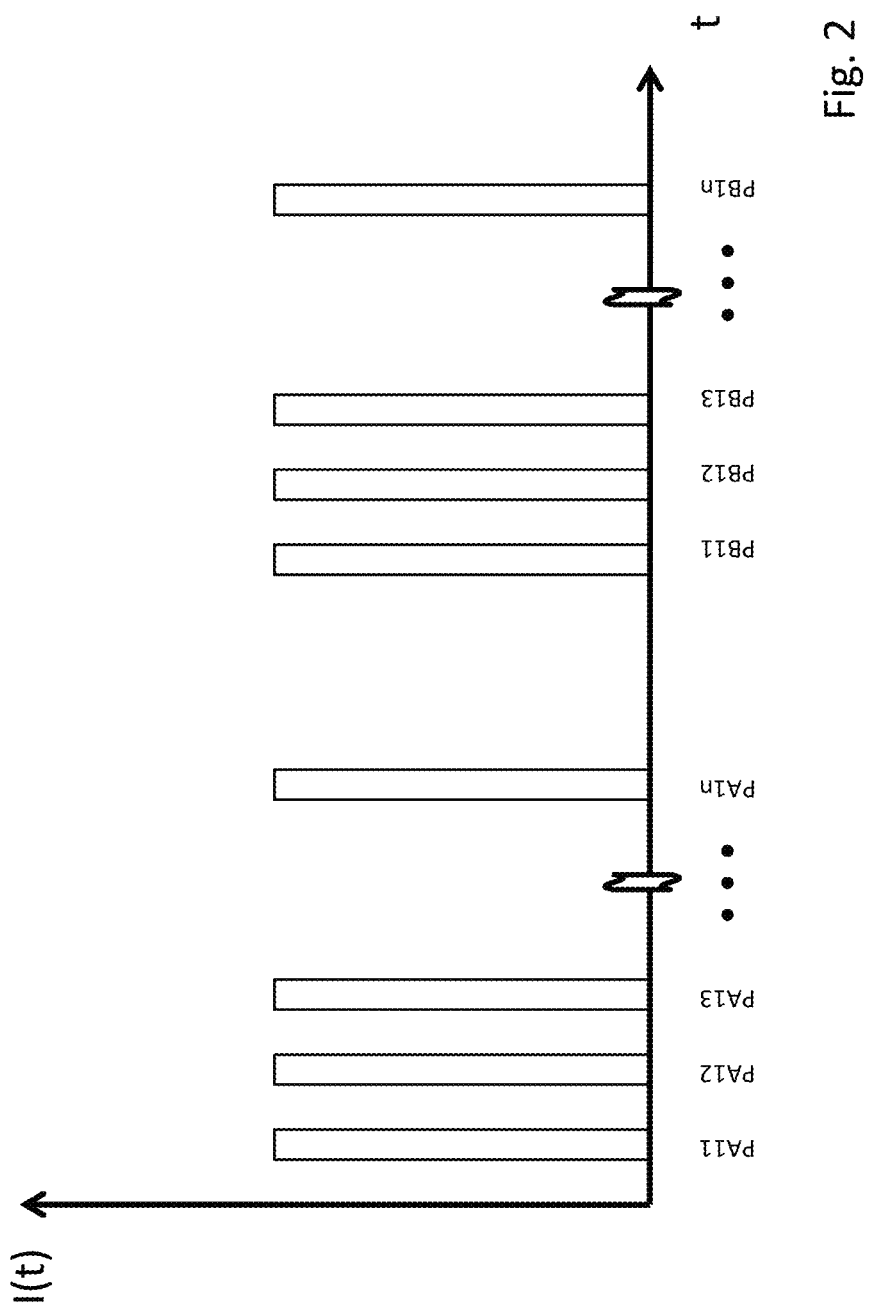
FIG. 2 shows a sequence of laser pulses for forming the array of marks according to the present invention.

According to the invention, the marks are formed by means of short laser pulses, as shown by way of example in FIG. 2. Here, PA11, PA12, ... PA1n designate laser pulses that are used for inscribing the marker points (see FIG. 1) A11, A12, ... A1n. The same applies to the laser pulses designated by PB11, ... PB1n.

For each laser pulse also a thin glass layer is heated. For the strength of a laser mark it turned out to be of advantage if this heat zone or thermal impact is kept as small as possible. For this purpose, laser pulses as short as possible are used. Therefore, if two adjacent marks would be written directly in succession one after the other, then this would result in a higher temperature of the material in the overlapping zone as compared to using single laser pulses; this would have a negative effect on the material strength. If, however, a sufficiently long interval without or with reduced exposure to radiation exists between adjacent individual marks, the temperature gradient caused by the preceding laser pulse is almost completely degraded and the temperature profile is similar to that for a laser bombardment without residual temperature at the formation of a directly adjacent mark. Elaborate series of experiments of the inventors about the time interval between laser pulses generated directly in succession one after the other have shown that the time interval should last at least 10 ms.

Figure 3:
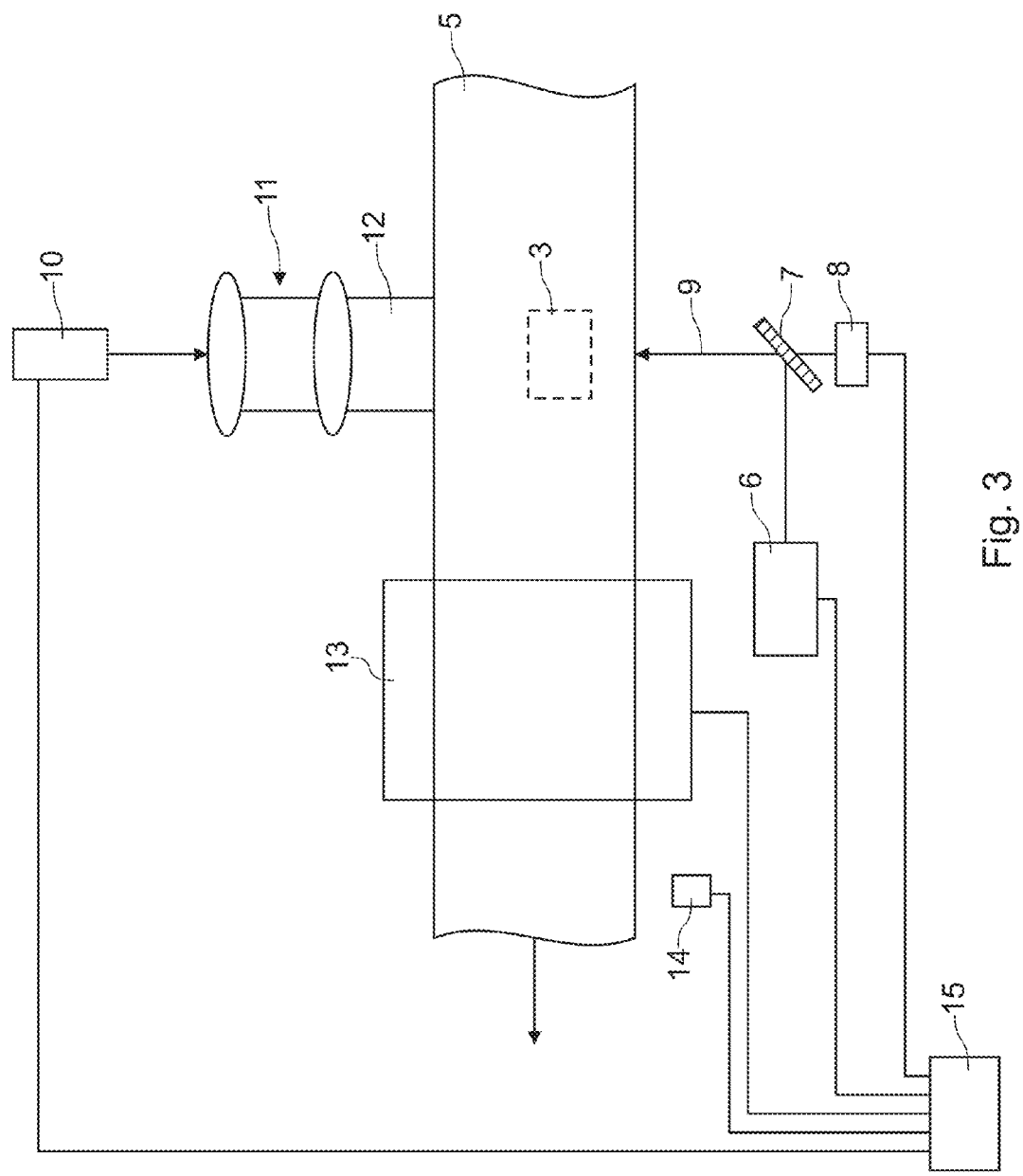
FIG. 3 shows an apparatus according to the present invention for forming an array of marks according to the present invention, as shown in FIG. 1.

FIG. 3 shows an example of an apparatus for performing the above method. It is assumed that the glass 5, for example a glass tube, which is drawn from a glass tube production line, is continuously or incrementally moved relative to a writing laser beam 9 of a write laser 6, the direction of movement being indicated by the arrow on the left-hand side of the drawing. According to FIG. 3, the writing laser beam 9 is suitably deflected by a scanner mirror 7 adjusted by a drive 8 for implementing a relative movement between the writing laser beam 9 and the glass 5. For example, the writing laser beam 9 can be scanned transversely across the circumference of the tube. The sequence of laser pulses described above with reference to FIGS. 1 and 2 is achieved by a suitable control of the writing laser 6 and a suitable control of the scanner 8 by means of a central control device 15. The writing laser may be a pulsed $CO_2$-laser having a pulse rise time of less than 75 µsec, pulse rates above 5 kHz and laser powers of less than 20 W, wherein the above parameters should be considered only as examples. In order to reduce the risk of crack formation even further and to enhance the required long-term strength, it has turned out to be of advantage to pre-heat the entire array of marks 3 (see FIG. 1) to a predetermined temperature, because the laser power is basically given by the characteristics of the glass and by the imaging of the writing laser beam respectively used for an optimum formation of the marker points. According to a further embodiment, in addition to the array of marks 3 also its immediate vicinity may be preheated. For this purpose, according to FIG. 3, a further heating laser 10 is used, which is suitably expanded by means of a telescope or a beam expander 11 and formed as an expanded heating laser beam 12, which is suitably imaged onto the glass 5. As a heating laser 10 especially, also a $CO_2$-laser may be used. Alternative heating sources may also be a burner or an infrared heater.

With such an additional heating device, the array of marks or the array of marks and its immediate vicinity may be heated to a predetermined temperature of at least 20K above the transformation temperature Tg of the glass.

As an alternative, which is in general conceivable but is not a preferred further alternative, the additional heat may also be dimensioned such that the temperature of the array of marks or of the array of marks and its immediate vicinity is heated to a temperature below a first predetermined temperature which is at least 20K above the transformation temperature of the glass, and the individual laser pulses may then be used to convert the respective zone of interaction of the writing laser beam with the glass to a suitable process temperature of at least 20K above the transformation temperature of the glass.

Figure 4:
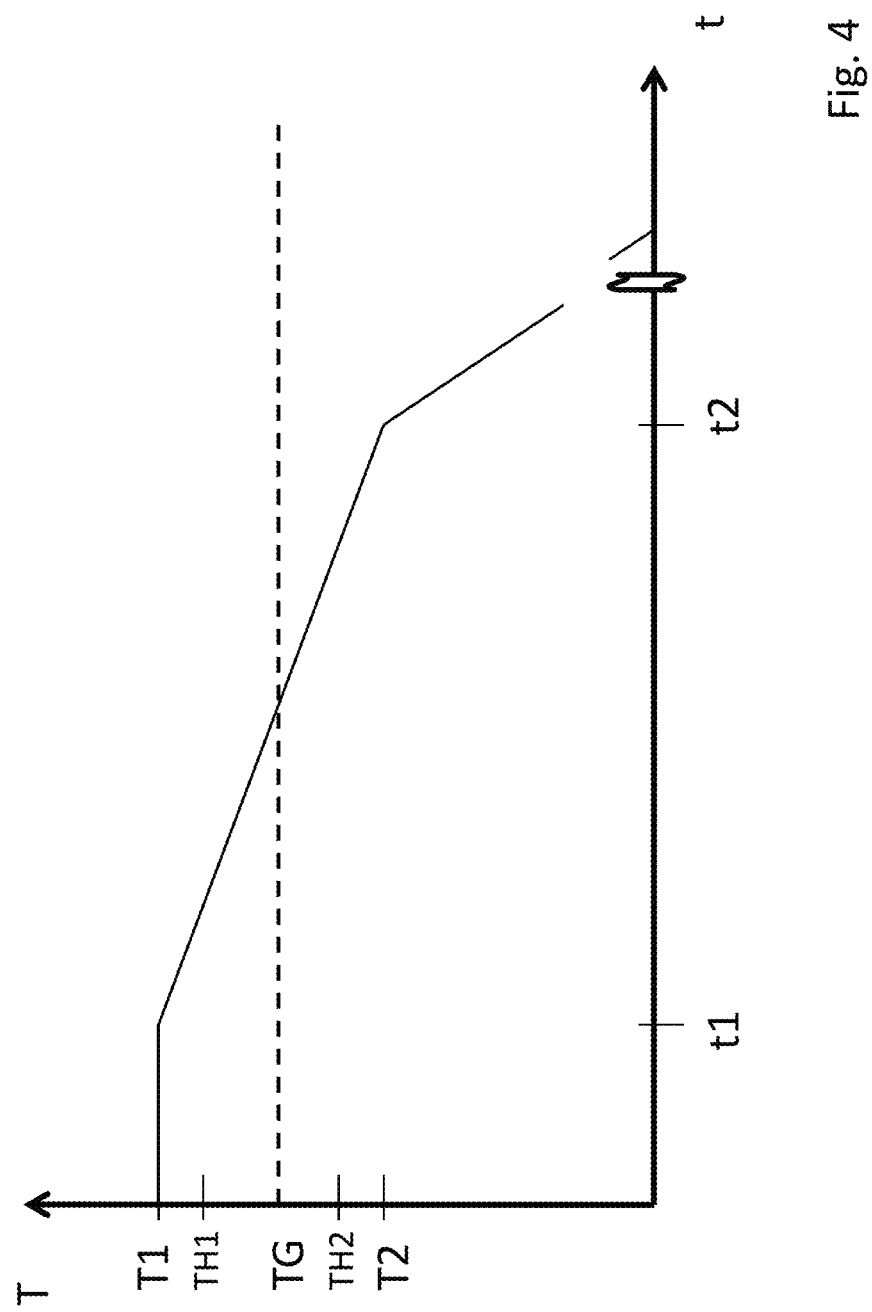
FIG. 4 shows the time dependency of marks or of the array of marks in a method according to the present invention.

FIG. 4 shows the process temperatures in a method according to the present invention. In the drawing the temperature T of an interaction zone, either of a single marker point or of the entire array of marks, is plotted against the time t. Tg designates the transformation temperature of the glass, which is typically in the range of 500° C. to 600° C. In the illustration of FIG. 4, the time dependency of the temperature rise on the process temperature T1 is not shown for reasons of simplification. The actual writing process starts at time zero at a temperature T1, which according to the present invention is at least 20K above the transformation temperature Tg of the glass. The laser pulse used for writing or inscribing has a time duration that is less than or equal to t1. After t1, the temperature of the interaction zone decreases in a controlled manner from a value T1 to a value T2, which is at least 20K and preferably at least 40K below the transformation temperature Tg of the glass. It must be ensured that all laser pulses act on the glass in this temperature range and in the time interval T1. According to FIG. 4, the temperature T2 is reached at time t2, wherein according to FIG. 4 a linear temperature ramp is used, although in principle any other temperature profiles are possible, as long as the maximum process temperature T1 during the controlled cooling is not exceeded again.

Upon reaching the temperature T2 mechanical tensions are already degraded to such an extent that subsequently a more rapid, optionally also an uncontrolled cooling, can be performed, until room temperature or the process temperature of a subsequent process step is attained. According to another embodiment, this additional cooling can be started upon attaining at a temperature of at least 50K below the transformation temperature of the glass.

For a controlled cooling in the temperature range T1 to T2 according to a first embodiment the heating laser beam 12 itself (FIG. 3) can be used by correspondingly reducing its power immediately after the formation of the array of marks. According to a further preferred embodiment, the array of marks 3 can also be introduced into a downstream cooling zone 13 immediately after the marking step and can run through this cooling zone optionally until the temperature T2 is reached. This downstream cooling zone 13 may for example be implemented by means of a conventional infrared furnace, which should preferably be in close spatial proximity to the area of interaction between the writing laser beam 9 and the glass 5.

In FIG. 4 TH1 or TH2 designate further possible preheating temperatures of the array of marks 3. Generally with appropriate dimensioning of the writing laser pulses, the preheating pulses can thus also be below the transformation temperature Tg, although a preheating temperature TH1 is preferably slightly lower than or identical to the first predetermined temperature T1.

Figure 5B:
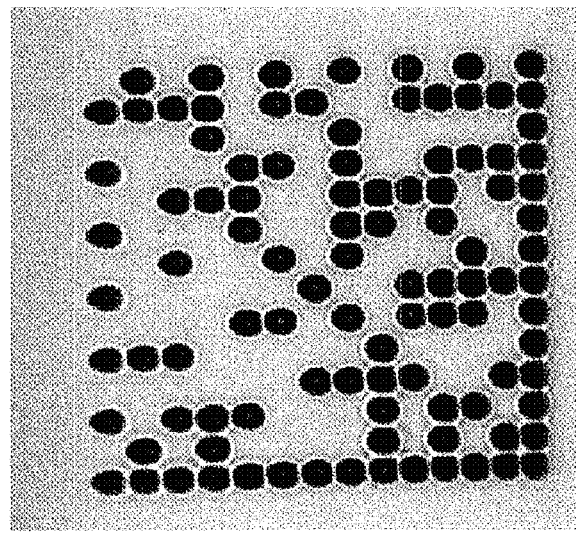
FIG. 5a and FIG. 5b show a comparative view of digital matrix codes according to the present invention.
Figure 5A:
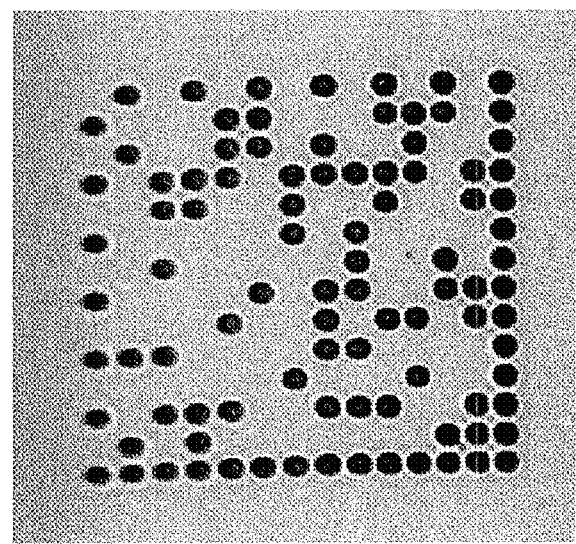

FIGS. 5a and 5b show a comparison of two matrix code marks formed on a glass tube that were generated at different power levels of the writing laser beam. While in the matrix code of FIG. 5a the individual marker points are mostly clearly separated from each other, they even merge partially in the matrix code according to FIG. 5b, which, however, surprisingly does not have an impact on the readability of the matrix code by means of an optical reading device. A matrix code as shown in FIG. 5b is generated in particular if laser spots are used for writing adjacent marker points that slightly overlap with each other. It has been found that such a small overlap can enhance the readability of matrix codes. The optimum amount of overlap depends on the reading device (lighting/optics) actually used. That is, the laser parameters can be optimized for a particular reading device.

With reference to FIGS. 6a to 7b in the following the influence of the temperature during heating of the glass before and during the encoding will be discussed. For this purpose the tension profiles across the laser-marked zone along two mutually orthogonal spatial directions were measured under otherwise identical process parameters. Shown is the optical delay (in degrees Friedel) that is a measure of the mechanical tension or stress in the glass.

Figure 6A:
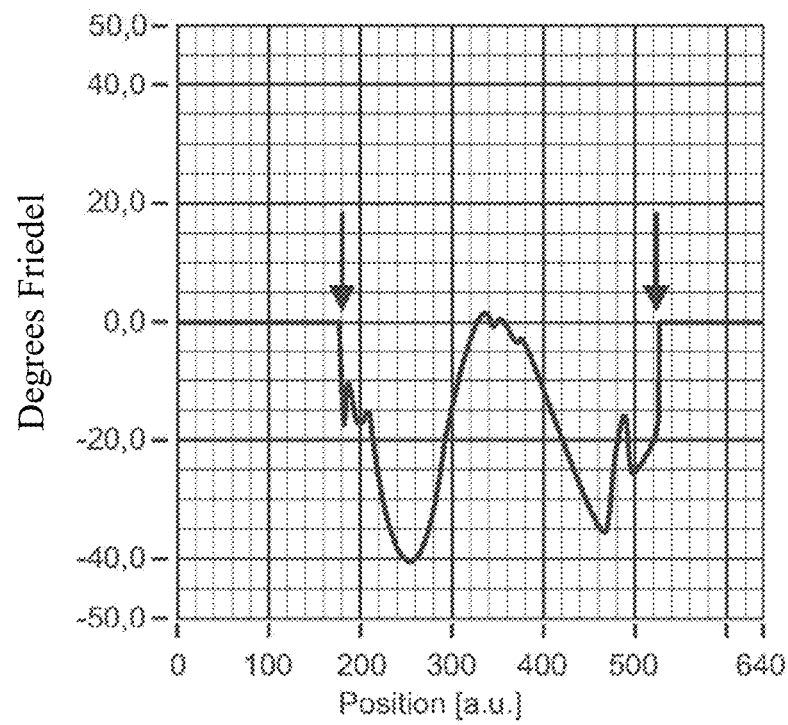
FIG. 6a and FIG. 6b show the tension profile across a mark along two axes orthogonal to each other, which has been generated by means of a conventional method without additional heating.
Figure 6B:
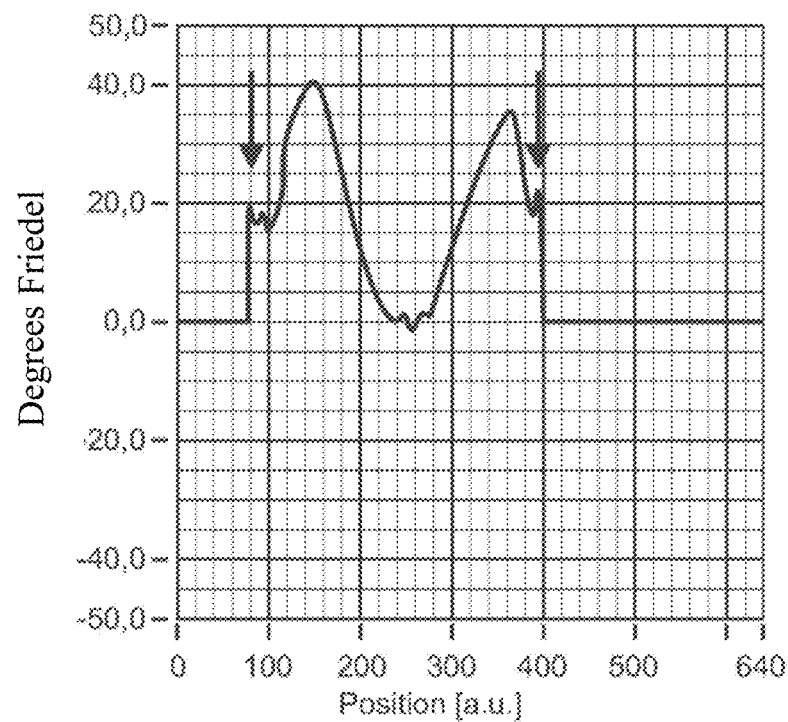

Thus, for example FIG. 6a shows the tension profile across a marker point in a first direction and FIG. 6b shows the corresponding tension profile in a direction perpendicular thereto (shown here is the so-called Friedel-degree). The vertical arrows mark the beginning of the tube wall, where the measurement of the respective tension profile is no longer meaningful due to the measuring method employed. As of these marking arrows therefore the respective curve was set to zero. This also applies to the other curves in FIGS. 7a to 8b.

For the marker point of the FIGS. 6a and 6b no additional heating was used before and during encoding. Rather the power of the write laser pulse has been chosen such that suitable temperatures above Tg could be achieved.

In contrast, for writing the marker point according to FIGS. 7a and 7b an auxiliary heater embodied as an additional heating laser beam is used, as shown in an exemplary manner in FIG. 3, namely an expanded laser beam of a further $CO_2$-laser. The power of the $CO_2$-laser was adjusted such that the array of marks to be inscribed and its immediate vicinity was already pre-heated up to the aforesaid first predetermined temperature or to a value just below this temperature, wherein the first predetermined temperature was a temperature of at least 20K above the transformation temperature of glass.

By comparing FIGS. 6a/6b and FIGS. 7a/7b it can be seen that marker points having significantly reduced tension can be accomplished by means of the additional pre-heating.

For heating the array of marks, in one embodiment a commercially available continuous 100 W $CO_2$-laser of Synrad Inc. was used, wherein the laser optics and a telescope where adjusted such that the entire array of marks could be heated to a temperature at least 20K above Tg before writing with the writing laser beam. With such a relatively short laser pre-heating a relative short pre-heating time of, for example, a maximum of 6 seconds could be implemented, so that the cycle times for writing or inscribing the matrix code could be considerably reduced. The deposition of energy was then, for example, 25 W $mm^{-2}$ $s^{-1}$ for a matrix code of size 2×2 mm.

A further reduction of tension can be implemented by means of the above described controlled cooling of the glass or glass product after performing the write operation, which will be described in the following with reference to the FIGS. 8a and 8b in more detail. For a controlled cooling a laser was used, whose laser parameters were adjusted such that the temperature of the array of marks was reduced from the value T1 (see FIG. 4) to a value T2, for example, 20K below Tg at a cooling rate of 1K/s. Thereby simultaneously also a laser annealing could be accomplished in order to prevent that the cooling during the encoding is performed too fast. An exemplary result is shown in FIGS. 8 and 8b and was obtained under similar conditions as for generating the laser mark, which was discussed with reference to FIGS. 7a and 7b above.

In the case of a finished product, such as a pharmaceutical product filled in a primary packaging of glass, a matrix code according to the present invention cannot be altered or manipulated. Unlike conventional marks that are written at room temperature, the matrix code proposed according to the present invention cannot be altered or tampered for a finished product, because the heat treatment necessary for this purpose cannot be implemented. The matrix code of the present invention is therefore safe against subsequent manipulations.

However, while being processed, i.e. as long as the temperature of the glass has not dropped too much, the matrix code can be made illegible or invalid by means of a heat treatment. This has for example the advantage that defective products determined during the processing can be marked reliably by destroying the matrix code and thus delivery to customers can be avoided. For this purpose, in the embodiment according to FIG. 3 an additional testing device 14 is provided, for example embodied as an optical detector, for testing or detecting the characteristics of the glass. When an error is detected, the central control unit 15 outputs a control command, which causes that the glass product 5 is introduced again into the processing zone of the writing laser beam 9 (or alternatively into the processing zone of a further writing laser beam provided downstream) in order to render the previously generated matrix code illegible.

Although it has been described above that the product to be marked should be a glass tube, which is drawn from a glass-tube manufacturing line, a preferred application of the present invention relates to the marking of individual primary packaging made of glass or a glass-like material, for example of a primary packaging for pharmaceutical or medical preparations, such as syringes, cartridges and vials, that can be marked and labeled in a reliable and tamper-proof manner by means of the process according to the present invention. If it should turn out for some reason that the primary packaging material shall not be used, the corresponding array of marks may be made illegible or not readable by means of the apparatus described above.

LIST OF REFERENCE NUMERALS 1 digital matrix code
2 single mark
3 heated area/array of marks
5 glass tube
6 marking laser/write laser
7 scanner/scanner mirror
8 scanner drive 9 writing laser beam
10 heating laser
11 telescope/beam expansion
12 expanded heating laser beam
13 cooling area/cooling furnace
14 detector/testing device
15 central control unit

The invention claimed is:

1. A method for marking of glass or a glass-like material for forming an array of marks in or on the glass or glass-like material, the array consisting of a plurality of discrete marks formed in discrete marking steps and distributed along at least one predetermined direction, comprising a plurality of discrete marking steps, in which,
in each marking step a writing laser beam and the glass or glass-like material are moved relative to each other, wherein for any given pair of marks, which are directly adjacent to each other in any one of said at least one predetermined direction, the pair of marks are formed in two separate marking steps that are not carried out directly in succession one after the other; and the plurality of discrete marking steps form at least two series of marks in said at least one predetermined direction, which are spaced apart from each other in regular intervals and interleaved in the predetermined direction; in which method the respective series of regularly spaced marks is formed either by a row-wise or column-wise relative movement between the writing laser beam and the glass or glass-like material along the predetermined direction or by the formation of the marks in a random sequence, the array of marks or the array of marks together with its immediate vicinity is heated to a predetermined temperature above the transformation temperature Tg of the glass, and the marks or the array of marks are cooled in a controlled manner during and/or after performing the marking steps until attaining a second predetermined temperature below the transformation temperature Tg of the glass.

2. The method according to claim 1, wherein the marks are formed by means of short laser pulses, wherein the marks of the array of marks form a two-dimensional matrix, in which the marks are disposed along two mutually orthogonal directions and spaced apart to each other, for encoding an information.

3. The method of claim 2, wherein the power of the short laser pulses is such that the marks are formed at a first predetermined temperature of at least 20K above the transformation temperature Tg of the glass.

4. The method of claim 3, wherein the array of marks or the array of marks together with its immediate vicinity are heated to a temperature below the first predetermined temperature.

5. The method according to claim 3, wherein a controlled infrared heating or a controlled optical radiation is used for the cooling in the controlled manner in order to accomplish a controlled tempering.

6. The method according to claim 1, wherein the array of marks or the array of marks together with its immediate vicinity is heated to said predetermined temperature by means of an expanded heating laser beam.

7. The method according to claim 1, wherein a controlled infrared heating or a controlled optical radiation is used for the cooling in the controlled manner in order to accomplish a controlled tempering.

8. The method according to claim 1, wherein the second predetermined temperature T2 is at least 20K and preferably at least 40K below the transformation temperature of the glass and/or a further cooling step is performed, if the temperature falls below the second predetermined temperature.

9. The method according to claim 8, wherein said further cooling step is performed, if the temperature falls below a temperature of at least 50K below the transformation temperature of the glass.

10. The method according to claim 1, wherein at least a period of 0.01 sec length exists between two marking steps for generating directly adjacent marks, in which the intensity of the writing laser beam in or on the glass is reduced or vanishing.

11. The method according to claim 1, wherein at least some of said discrete marks, which are directly adjacent to each other in the array of marks, partially overlap with each other.

12. The method according claim 11, wherein those discrete marks, which are directly adjacent to each other in the array of marks, are formed such that they overlap with each other to some extent.

13. The method according to claim 12, wherein those discrete marks, which are directly adjacent to each other in the array of marks, are formed as circular marks, each with a predetermined diameter and such that the respective predetermined diameter of said directly adjacent marks is larger by up to 10% than the distance between these marks.

14. The method according to claim 12, wherein those discrete marks, which are directly adjacent to each other in the array of marks, are formed as circular marks, each with a predetermined diameter and such that the respective predetermined diameter of said directly adjacent marks is larger by up 20% than the distance between these marks.

15. The method according to claim 1, wherein the glass or a glass product formed therefrom is tested still in a heated state, and the marks of the array of marks of a defective glass or glass product are made illegible or invalid by heat treatment.

16. An apparatus for marking of glass or a glass-like material by means of an array of marks by forming plurality of discrete marks in or on the glass or glass-like material, the array consisting of a plurality of discrete marks formed in a plurality of discrete marking steps and distributed along at least one predetermined direction, said apparatus comprising:

a writing laser for generating a writing laser beam imaged on the glass or the material in said plurality of discrete marking steps and an adjusting means for moving the writing laser beam and the glass or the material relative to each other in each marking step of said plurality of discrete marking steps, wherein the adjusting means is configured for moving the writing laser beam and the glass or the material relative to each other such that a plurality of discrete marks is formed in or on the glass or material, which together form said array of marks, and a controlling means is provided, which is configured such that, for any given pair of marks, which are directly adjacent to each other in any one of said at least one predetermined direction, the pair of marks are formed in two separate marking steps that are not carried out directly in succession one after the other; and the plurality of discrete marking steps form at least two series of marks in said at least one predetermined direction, which are spaced apart from each other in regular intervals and interleaved in the predetermined direction;

in which apparatus the controlling means is further configured such that the respective series of regularly spaced marks is formed either by a row-wise or column-wise relative movement between the writing laser beam and the glass or glass-like material along the predetermined direction or by the formation of the marks in a random sequence, the array of marks or the array of marks together with its immediate vicinity is heated to a predetermined temperature above the transformation temperature Tg of the glass, and the marks or the array of marks are cooled in a controlled manner during and/or after performing the marking steps until attaining a second predetermined temperature below the transformation temperature Tg of the glass.

17. The apparatus according to claim 16, wherein the writing laser forms the marks by means of short laser pulses, wherein said controlling means is further configured such that the marks of the array of marks form a two-dimensional matrix, in which the marks are disposed along two mutually orthogonal directions and offset to each other for encoding information.

18. The apparatus according to claim 17, wherein said heating device is a heating laser which emits an expanded heating laser beam.

19. The apparatus according to claim 18, wherein the power of the short laser pulses of the writing laser is such that the marks are formed at a first predetermined temperature T1 of at least 20K above the transformation temperature Tg of the glass.

20. The apparatus according to claim 19, wherein the heating laser emits the expanded heating laser beam such that the array of marks or the array of marks and its immediate vicinity is heated to a temperature below the first predetermined temperature.

21. The apparatus according to claim 16, wherein the optical radiation source is further configured such that the second predetermined temperature T2 is at least 20K and preferably at least 40K below the transformation temperature of the glass.

22. The apparatus according to claim 16, wherein said controlling means is further configured such that at least a period of 0.01 sec length exists between two marking steps for generating directly adjacent marks, in which the intensity of the writing laser beam in or on the glass is reduced or vanishing.

23. The apparatus according to claim 16, wherein said controlling means is further configured such at least some of said discrete marks, which are directly adjacent to each other in the array of marks, partially overlap with each other.

24. The apparatus according to claim 23, wherein said controlling means is further configured such that those discrete marks, which are directly adjacent to each other in the array of marks, are formed as circular marks, each with a predetermined diameter and such that the respective predetermined diameter of said directly adjacent marks is larger by up to 10% than the distance between these marks.

25. The apparatus according to claim 24, further comprising a testing and processing means for checking the glass or a resulting glass product formed therefrom still in a heated state and for making the marks on the array of marks of a defective glass or glass product illegible or invalid by heat treatment.

26. The apparatus according to claim 23, wherein said controlling means is further configured such that those discrete marks, which are directly adjacent to each other in the array of marks, are formed as circular marks, each with a predetermined diameter and such that the respective predetermined diameter of said directly adjacent marks is larger by up to 20% than the distance between these marks.

27. A method for marking of glass or a glass-like material for forming an array of marks in or on the glass or glass-like material, the array consisting of a plurality of discrete marks formed in discrete marking steps and distributed along at least one predetermined direction, comprising a plurality of discrete marking steps, in which, in each marking step a writing laser beam and the glass or glass-like material are moved relative to each other, wherein for any given pair of marks, which are directly adjacent to each other in any one of said at least one predetermined direction, the pair of marks are formed in two separate marking steps that are not carried out directly in succession one after the other; and the plurality of discrete marking steps form at least two series of marks in said at least one predetermined direction, which are spaced apart from each other in regular intervals and interleaved in the predetermined direction; in which method the respective series of regularly spaced marks is formed by the formation of the marks in a random sequence.

* * * * *